United States Patent [19]

Kansupada et al.

[11] Patent Number: 5,137,070
[45] Date of Patent: Aug. 11, 1992

[54] TIRE WITH COATING THEREON TO INHIBIT STAINING

[75] Inventors: Bharat K. Kansupada, Mogadore, Ohio; Syed K. Mowdood, Madison, Conn.

[73] Assignee: The Goodyear Tire & Rubber Company, Akron, Ohio

[21] Appl. No.: 583,258

[22] Filed: Sep. 4, 1990

[51] Int. Cl.$^5$ .................. B60C 13/04; B60C 13/00
[52] U.S. Cl. ........................ 152/524; 152/525
[58] Field of Search ................ 152/524, 525; 156/90

[56] References Cited

U.S. PATENT DOCUMENTS

| | | | |
|---|---|---|---|
| 2,240,855 | 5/1941 | Phillips | 152/524 |
| 2,240,856 | 5/1941 | Phillips | 152/524 |
| 2,731,060 | 1/1956 | Rowe | 152/524 |
| 3,904,562 | 9/1975 | Hopfenberg et al. | 106/493 X |
| 4,452,883 | 6/1984 | Frenchik et al. | 430/338 X |
| 4,460,681 | 7/1984 | Frenchik | 430/338 X |
| 4,950,052 | 8/1990 | Fergason et al. | 428/1 X |

OTHER PUBLICATIONS

*Encyclopedia of Chemical Technology*, 3rd ed. Kirk-Othmer: vol. 23, 1983 by John Wiley & Sons, pp. 963–976.

*Primary Examiner*—Michael W. Ball
*Assistant Examiner*—Adrienne C. Johnstone
*Attorney, Agent, or Firm*—Henry C. Young

[57] ABSTRACT

A cured rubber tire having a surface coated with at least one of polyvinylpyrrolidone and a monovalent water soluble salt of methylvinylether/maleic acid copolymer.

1 Claim, No Drawings

TIRE WITH COATING THEREON TO INHIBIT STAINING

FIELD

This invention relates to a cured rubber tire sidewall having a coating thereon comprised of at least one of methylvinylether/maleic acid copolymer and polyvinylpyrrolidone, optionally in combination with polyvinylalcohol.

BACKGROUND

Tire sidewalls are often coated with protective paints or coatings, particularly tire sidewalls having a color which contrasts with the typical black colored remainder of the tire. The general purpose of such a protective coat or painting is to inhibit or prevent migration of chemicals to the tire rubber composition from the surface of an adjacent black colored tire which would otherwise tend to stain and thus, discolor the rubber. The staining usually becomes evident after exposure of the contacted rubber surface to ultra-violet light such as sunlight. Such contact staining phenomenon is well known.

Rubber tires are typically black in color due to the carbon black reinforcement contained therein. If a contrasting or other color is desired for a part of the tire, then a coloring pigment is used rather than the carbon black. Conventionally, various of the compounding ingredients used in the formulation of rubber for the manufacture of rubber products such as tires are of the staining type, namely, amine based antidegradants and aromatic rubber processing oils. The materials tend to migrate to the surface of the rubber and may stain or discolor a rubber surface of another rubber article which may come in contact with it for a period of time, particularly after the contacted rubber is then exposed to ultra-violet light.

Often, a polyvinylalcohol (PVA) based coating is used to protect such contrastingly colored rubber surfaces from other rubber surfaces of the staining type because the polyvinylalcohol itself tends to be a barrier for the migration of such staining material. Moreover, the PVA can normally be easily removed from the coated rubber surface, when and if desired, by simple water washing, usually with a soap solution, since the PVA itself normally has a relatively high degree of water solubility, particularly when the water contains a surfactant. Thus, the PVA coat has a primary use for storage and shipping of the tires. It may easily be removed by the user by water washing.

PVA is normally used in conjunction with (mixed with) a plasticizer therefor so that the resulting PVA-based coating has a degree of flexibility. Such PVA mixture is referred to herein as PVA coating.

Accordingly, it is desired to provide a coating composition and a resultant coated rubber product, particularly a coated tire sidewall rubber surface, which will retard, inhibit and/or prevent the migration of amine based antidegradants and aromatic processing oils onto the rubber sidewall surface, such as a white sidewall, from an adjacent and contacting black cured rubber surface.

DISCLOSURE AND PRACTICE OF THE INVENTION

In accordance with this invention, a cured rubber tire is provided having at least one surface coated with a composite based on a composition comprised of (A) polyvinylpyrrolidone, (B) monovalent water soluble salt of methylvinylether/maleic acid copolymer, or (C) a composition comprised of (i) 100 parts by weight polyvinylalcohol and (ii) from about 40 to about 60 parts by weight of a at least one of polyvinyl pyrrolidone and monovalent water soluble salt of methylvinylether/maleic acid copolymer.

In a preferred embodiment, the said coated tire surface has a color contrasting with black. Preferably, the said coated tire surface has a white color. This is the color of the cured rubber surface to which the protective coating is applied.

Thus, in one aspect of this invention, a pneumatic tire is provided of which a portion of said cured rubber contains at least one pigment loading selected from particulate titanium dioxide and zinc oxide in the absence of carbon black wherein the surface of said portion has a coating thereon of the composition of claim 1 and where said salt of methylvinylether/maleic acid copolymer is a sodium salt thereof. Preferably, the said pigment is titanium dioxide, although zinc oxide is also normally present as a rubber compounding ingredient. Clay is usually used in conjunction with the titanium dioxide.

In the practice of this invention, it is understood that the coating includes a suitable plasticizer therefor, such as for example, glycerin and/or polyglycerol to make the coating more flexible. While the choice of plasticizers may not be entirely critical, it should be a plasticizer which does not substantially reduce the resistance of the coating to the migration of the aforesaid staining materials. Typically the coating is comprised of 100 parts by weight of the aforesaid polyvinylpyrrolidone, methylvinylether/maleic acid copolymer or combination thereof with PVA and about 20 to about 30 or even up to about 35 parts by weight plasticizer.

As hereinbefore referenced, various ingredients are conventionally used in the compounding of rubber for the manufacture of rubber articles, including tires, which are well known to those having skill in such art such as the various antidegradants, processing oils and the like as well as reinforcing pigments, processing aids, curatives and curing aids, including accelerators.

While the mechanism may not be entirely and completely understood, it is believed that the said coating composition applied to a tire's white sidewall, for example, acts as a barrier to substantially retard a migration of staining antidegradant compounds and aromatic processing oils from black sidewalls and treads of a tire to another adjacent tire with the coated white sidewall. While a precise mechanism may not be entirely understood with clear certainty, it is, at least in one aspect, that some antidegradants and aromatic oils, or components thereof, tend to decompose to form discolorants which can migrate from black sidewalls or treads of tires to white sidewalls of adjacent tires and show a visible stain in such white sidewalls.

Thus, there is a particular benefit in utilizing the coating composition for coating at least a portion of the sidewall of a rubber tire, particularly a pneumatic rubber tire, namely, the white sidewall portion, because it minimizes or prevents staining of the white sidewall of a rubber tire which is positioned against another cured rubber tire.

The methylvinylether/maleic acid copolymer is used or characterized as a water soluble monovalent salt (such as, for example, a sodium, potassium or ammonium, preferably sodium salt) of methylvinylether/maleic acid copolymer because of its water solubility and effectiveness in minimizing or preventing the aforesaid staining.

The polyvinylpyrrolidone can further be described as a polymer of N-vinyl-2-pyrrolidone.

The advantages of this invention are more particularly shown by the following example in which the parts and percentages are by weight unless otherwise indicated.

EXAMPLE I

Sulfur cured white colored and black colored rubber samples were obtained having the dimensions of about 2 inches by 2 inches with a thickness of about ⅛ inch (5 cm × 5 cm × 0.03 cm).

The white colored samples contained a particulate titanium dioxide white coloring pigment without carbon black reinforcement and thus were white in color.

The black colored samples contained carbon black without titanium dioxide and were thus, black in color. Further, the black colored samples contained staining antidegradant and aromatic processing oil whereas the white colored samples did not.

Water based coating compositions were prepared of Polyvinylalcohol coating material (Control Coating A) polyvinylpyrrolidone (Experimental Coating B); sodium salt of methylvinylether/maleic acid copolymer (Experimental Coating C); and a mixture of sodium salt of methylvinylether/maleic acid copolymer and polyvinylalcohol (Experimental Coating D).

The water based coating compositions (A, B, C and D) were individually and separately coated onto individual white cured rubber samples and allowed to dry in a circulating hot air oven.

For illustrative purposes, the coating compositions comprised the mixtures shown in Table 1. Water (as a solvent) is combined with the ingredients to form a mixture containing about 20–25 percent solids.

TABLE 1

| Materials | Coat A | Coat B | Coat C | Coat D |
|---|---|---|---|---|
| Polyvinylalcohol[1] | 100 | 0 | 100 | 100 |
| Polyvinyl-Pyrrolidone[2] | 0 | 100 | 100 | 0 |
| Methylvinylether/maleic acid copolymer[3] | 0 | 0 | 0 | 50 |
| Glycerine[4] | 23 | 27 | 27 | 11.5 |
| Polyglycerol[5] | 2.4 | 3.3 | 2.4 | 1.2 |
| Fluoro Surfactant[6] | 1.8 | 1.81 | 1.8 | 0.9 |

[1] Obtained as AIRVOL 205 from Air Products, Inc..
[2] Obtained as PVP K-60 from GAF, Inc.
[3] Obtained as GANTEREZ S-95 from GAF, Inc.
[4] A high specific gravity glycerine obtained from The Proctor & Gamble Co.
[5] Obtained as RZN-POLYGLYCEROL from Chemical Components, Inc.
[6] Obtained as ZONYL FSP from DuPont de Nemours and Company, Inc.

For evaluation of stain barrier properties, the cured white rubber samples are individually coated with the coating compositions A, B, C and D. A cured black colored (carbon black pigmented) rubber containing staining antidegradants and aromatic processing oil is placed on top of each of the coated rubber sample surface to form an assembly thereof. A one pound weight is placed on top of the assembly and the assembly placed in a hot air oven at 70° C. for a period of about 12 to 24 hours. The assembly is then removed from the oven, the coated sample removed from the assembly, washed with detergent containing water to remove the coating therefrom and the exposed surface then exposed to ultraviolet light for about 2 hours. The extent of discoloration, or staining, of the sample can be visually observed or numerically measured using a photo volt reflectance procedure.

The results for the samples A–D are shown in Table 2. They are compared to a cured white rubber not coated with PVA or coating of this invention but submitted to the staining test of this Example and, also to a cured white rubber sample without such coating and without being submitted to the staining test.

TABLE 2

| Sample | Photo Volt Test | Visual Observation |
|---|---|---|
| Uncoated Sample[1] | 21 | severe stain |
| A | 39 | moderate stain |
| B | 62 | little or no stain |
| C | 56 | little or no stain |
| D | 62.5 | little or no stain |
| Untreated Sample[2] | 62.5 | no stain observed |

[1] A white cured rubber sample without applied coating but submitted to staining test, thus, a control.
[2] A white cured rubber sample without applied coating and not submitted to the staining test, thus, a control.

The following conclusions were made for the coatings for the representative samples:

TABLE 3

| Sample | Conclusion |
|---|---|
| A | moderately effective stain barrier |
| B | a substantially improved stain barrier |
| C | a substantially improved stain barrier |
| D | a substantially improved stain barrier |

Thus, for samples B, C and D, the applied coating acted to prevent staining of a white colored cured rubber when pressed against a black colored cured rubber and, thus, demonstrated a beneficial effect.

It is concluded that the coating utilized in this invention is suitable to minimize contact staining of tire white sidewalls during storage and shipping where a number of tires are usually in contact with each other.

What is claimed is:

1. A pneumatic tire composed of cured rubber of which a portion of said cured rubber contains at least one pigment loading selected from the group consisting of particulate titanium dioxide and particulate zinc oxide in the absence of carbon black wherein the surface of said portion has a coating thereon of a composite based on a composition comprised of 100 parts by weight of polyvinylpyrrolidone and about 25 to about 35 parts by weight of a plasticizer comprised of at least one of glycerin and polyglycerol.

* * * * *